Patented Apr. 6, 1948

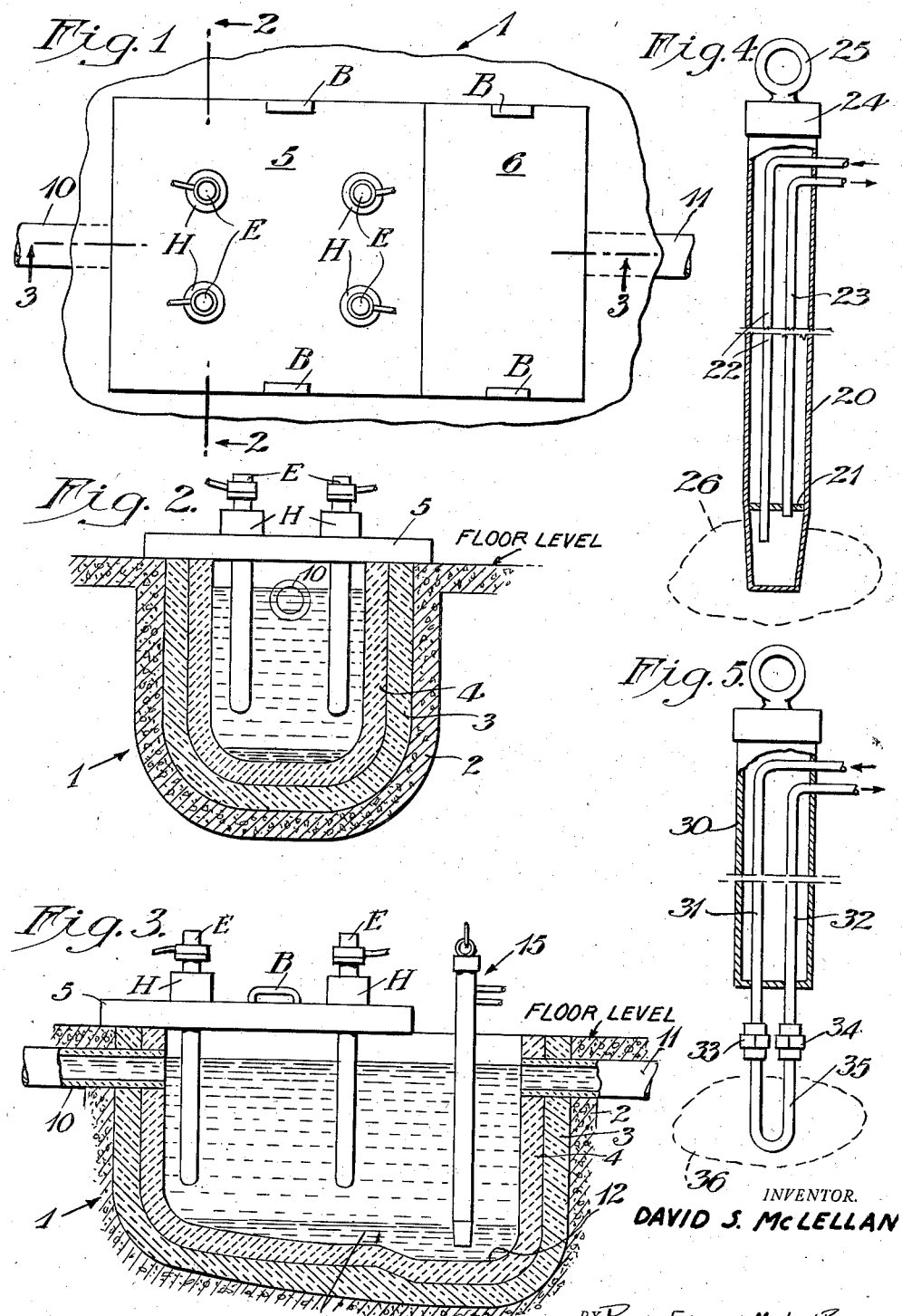
INVENTOR.
DAVID S. McLELLAN

2,439,216

UNITED STATES PATENT OFFICE 2,439,216

METHOD FOR REMOVING METALLIC IRON FROM A FUSED ALUMINA-CRYOLITE COMPOSITION

David S. McLellan, Longview, Wash., assignor to Reynolds Metals Company, Richmond, Va., a corporation of Delaware Application July 23, 1946, Serial No. 685,649

3 Claims. (Cl. 75—29)

This invention relates to the production of aluminum from aluminiferous fusions. The invention is especially concerned with the purification of alumina-containing material for use in the electrolytic reduction of alumina and provides improvements for removing metal reduced from oxidic impurities in the fusions. In those operations in which crude alumina-containing material, such as calcined bauxite, is added to alumina-depleted cryolite fusions and oxidic impurities, notably iron oxide, are reduced, the reduced iron settles to the bottom of the confining vessel and my invention provides an improved method of and apparatus for removing the reduced iron.

My invention is particularly concerned with the reduction of the oxidic impurities from fusions in vessels which are located in the earth, that is to say, below the ground or floor level of the plant, and from which the accumulated iron cannot be removed by gravity flow.

In removing an accumulated body of iron by my invention, I insert into the body of reduced iron a cooling and removing means that I shall refer to as a "lifting device." This device comprises a tubular portion insertable through the fusion into the body of iron, the lower end of which is provided with a cooled snout with means therein for circulating a cooling fluid to freeze a mass of iron around the snout. When a sufficiently large mass is frozen on the snout, I raise the lifting device with a crane or the like and remove the mass of iron from the fusion. I may use a cooling snout in the form of a hollow steel member on which the iron mass becomes frozen and then removed on cooling, or I may use a removable tubular iron snout in which the cooling medium circulates and which may be detached from the lifting device leaving the iron snout embedded in the mass of iron. The mass of iron may be used in the steel industry as a source of raw iron.

The accompanying drawings illustrate somewhat diagrammatically an arrangement of apparatus such as may be used in practicing my invention:

Fig. 1 is a plan view of the apparatus;

Fig. 2 is a sectional view along line 2—2 of Fig. 1;

Fig. 3 is a sectional view along line 3—3 of Fig. 1;

Fig. 4 is a side view partly in section of one form of lifting device, and

Fig. 5 is a side view partly in section of another form of lifting device.

The reduction vessel 1 illustrated in Figs. 1, 2 and 3 is located largely in the earth with the upper edge thereof approximately at the floor level of the plant. In immediate contact with the earth is a supporting layer of concrete 2. Inside the layer of concrete is a layer of rammed alumina 3 for insulating purposes. The inner lining of the vessel which is in direct contact with the fusion is carbon pot lining 4. The vessel has a removable cover comprising parts 5 and 6 which may also be formed of pot lining or other suitable refractory material. Part 5 supports the alternating current heating electrodes E which are suspended in the fusion by the holders H. Each of the covers is provided with two brackets B by means of which they may be removed with a crane. The aluminiferous fusion undergoing treatment comprises a solution of alumina in cryolite which may contain other fluorides such as calcium fluoride or barium fluoride. The crude alumina-containing material to be purified may be a calcined bauxite of the type having the following composition:

| | |
|---|---|
| $Al_2O_3$ | 61.59 |
| $Fe_2O_3$ | 27.71 |
| $TiO_2$ | 4.01 |
| $SiO_2$ | 4.55 |
| Ignition loss | 1.70 |

The invention is advantageously suitable for use in operations for the treatment of alumina-containing fusions which are circulated through electrolytic reduction cells which comprise means for adding dry calcined bauxite, and reducing iron oxide therefrom. By way of illustration, the vessel 1 is a reduction means in such operations in which the alumina-depleted fusion from an electrolytic reduction operation, with added crude calcined bauxite, flows through the duct 10 into the vessel 1. Any suitable form of carbon, such as petroleum coke, is mixed with the fusion and the electrodes E heat the fusion to the required temperature usually around 1050° C. to 1200° C. The cryolite exercises a sort of catalytic action, causing an effective reduction of iron oxide to take place. The reduced iron settles through the fusion to the bottom of the vessel, whereas the alumina-enriched fusion flows out of the vessel through the duct 11. As best shown in Fig. 3, the bottom of the vessel slopes towards the right and includes a sump 12 wherein the iron accumulates in the form of a rather thick body or layer 13. The reduced iron may or may not be in a fused or liquid state. While it is usually plastic or pasty, it may be a sedimentation of solid particles accumulated in surrounding cryolite fusion which serves as a matrix. In either case, whether the iron itself is liquid and then frozen or whether the surrounding cryolite freezes around the accumulated particles of solid iron, I am able to lift a frozen mass of iron out of the vessel.

When the iron has accumulated in the sump 12 to an amount where its removal is necessary, the cover 6 is lifted off and the lifting device 15 is inserted through the fusion to the bottom of the sump. By circulating cooling water through the lifting device, the iron in the sump loses its heat and, if liquid or pasty, solidifies around the lower end of the lifting device. A similar result is accomplished if the iron is in the form of a sedimentation of solid particles because the fusion solidifies and binds them into a solid mass which adheres to the lifting device. After a sizable mass of the iron is thus formed, the lifting device is removed with a crane. Repeated removals may be made to remove the desired amount of iron and the cover 6 replaced.

Fig. 4 illustrates a form of lifting device comprising a steel tubular shell 20, the lower end or snout of which is tapered to form a truncated cone and has a partition 21 near the bottom through which the water circulating coils 22 and 23 are inserted. This partition confines the cooling liquid to the snout and minimizes the cooling of the tube 20 where it contacts the overlying cryolite fusion. Pipe 22 is connected by a hose to a source of cold water and pipe 23 is connected by a hose to a drain. The top of the tube 20 has a cap 24 to which a ring 25 is welded for attachment to the crane. The mass of iron 26 frozen onto the snout can easily be freed from the snout by fracturing it with a sharp hammer blow.

The lifting device illustrated in Fig. 5 comprises a tubular member 30 in which the circulating water pipes 31 and 32 are mounted. The pipes have union connections 33 and 34 for attaching the U-shaped pipe snout 35. In this form of the invention only the snout 35 is inserted into the body of iron. When the iron mass 36 is solidified, the snout 35 is permanently embedded in the iron. By unscrewing the union connections 33 and 34, the snout 35 and mass of iron are removed as a unit. Cooling water enters through either pipe 31 or 32 and flows to drain through the other. The body of iron accumulated in the sump 12 is usually in a sufficiently pure condition to be suitable for use in the steel industry. It may be used to charge electric furnaces, open hearth furnaces and the like.

When the bauxite contains silica and titania, as in the aforementioned composition, there is a certain amount of reduced silicon and titanium accompanying the iron. When carbon is the reducing agent, the reduced metal is largely iron, but when other or additional reducing agents such as aluminum or ferroaluminum are used, then silicon and titanium are also produced and accompany the iron. The resulting iron-base alloy is also very useful for addition to steel melting furnaces.

I have referred to the circulation of cooling water through pipes 22 and 23 of Fig. 4 and pipes 31 and 32 of Fig. 5. I may use compressed air for this purpose. Although the cooling capacity of air is lower than that of water, its use is less hazardous because of the possibility of leaks into the molten bath.

I claim:

1. In the treatment of aluminiferous cryolite fusions with a reducing agent to reduce iron oxide to iron in which the iron settles to the bottom of the confining vessel, the improvement which comprises inserting into the body of reduced iron a lifting device, cooling that portion of the lifting device which is inserted into the body of iron to freeze a mass of iron thereon, and lifting the frozen mass of iron adhering to the lifting device out of the fusion.

2. In the treatment of aluminiferous cryolite fusions with a reducing agent to reduce iron oxide to iron in which the iron settles to the bottom of the confining vessel, the improvement which comprises carrying out the reduction at a temperature in the range of 1050° C. to 1200° C. to form a semi-pasty body or iron in the confining vessel, inserting into the body of iron a lifting device, cooling that portion of the lifting device inserted into the body of iron to freeze a mass of iron thereon, and raising the lifting device to remove the mass of frozen iron out of the fusion.

3. In the reduction of iron oxide from an alumina-containing fusion in a confining vessel and the accumulation of the reduced iron on the bottom of the vessel, the improvement which comprises freezing a mass of the collected iron around a lifting device and lifting the frozen mass out of the vessel.

DAVID S. McLELLAN.

REFERENCES CITED

The following references are of record in the file of this patent:

UNITED STATES PATENTS

| Number | Name | Date |
|---|---|---|
| 503,783 | Bush | Aug. 22, 1893 |
| 677,207 | Hall | June 25, 1901 |
| 2,265,243 | McCullough et al. | Dec. 9, 1941 |